United States Patent Office 3,413,283
Patented Nov. 26, 1968

3,413,283
PROCESS FOR PREPARING
5'-PURINENUCLEOTIDES
Hiroaki Nomura, Monioo, and Norihiro Uno, Suita,
Japan, assignors to Takeda Chemical Industries,
Ltd., Osaka, Japan
No Drawing. Filed July 13, 1966, Ser. No. 564,764
Claims priority, application Japan, July 14, 1965,
40/42,424
7 Claims. (Cl. 260—211.5)

ABSTRACT OF THE DISCLOSURE

The present invention relates to a process for preparing 5'-purinenucleotide which comprises heating (A) an acetylated purine derivative selected correspondingly to the said 5'-purinenucleotide, from the group consisting of acetylated hypoxanthine, acetylated guanine and acetylatedadenine, with (B) a tertiary amine salt of acetylpentose-5-monophosphate selected, correspondingly to the said 5'-purinenucleotide, from the group consisting of 1,2,3,-triacetylribose-5-monophosphate and 1,3-diacetyl-2-deoxyribose-5-monophosphate; and subjecting the product of the ensuing reaction to action of a deacetylating agent.

---

The present invention relates to a novel and advantageous process for preparing 5'-purinenucleotides. More particularly, the present invention relates to a process for preparing 5'-purinenucleotides such as (I) inosine-5'-monophosphate and/or inosine-5'-diphosphate, (II) guanosine-5'-monophosphate and/or guanosine-5'-diphosphate, (III) adenosine-5'-monophosphate and/or adenosine-5'-diphosphate, (IV) 2'-deoxy-inosine-5'-monophosphate and/or 2'-deoxy-inosine-5'-diphosphate, (V) 2'-deoxy-guanosine- 5'-monophosphate and/or 2'-deoxy-guanosine-5'-diphosphate and (VI) 2'-deoxy-adenosine-5'-monophosphate and/or 2'-deoxy-adenosine-5'- diphosphate.

Although many processes for synthesizing purinenucleoside-5'-monophosphate and purinenucleoside-5'-diphosphate have been proposed and tried, they have not been entirely satisfactory for industrial purposes because of, for example, the necessity of using expensive starting materials, the realization of low yields, or the involvement of many troublesome reaction steps.

More concretely, hitherto proposed processes for chemically synthesizing purinenucleoside-5'-monophosphates can be divided into three groups. Processes of the first group comprise reacting 2,3-diacyl-5-diphenylphosphoryl-D-ribosyl bromide with mercury salt of purine derivatives; those of the second group comprise reacting 2,3-diacyl-5-diphenylphosphoryl-D-ribonosyl bromide with trimethylsilylpurine derivaties; and those of the third group comprise reacting 5-phosphoryl-ribosyl amine with ethyl (N-carbamoyl-cyanomethyl) formimidate, followed by treating with ethyl orthoformate.

Processes of the first and second groups are not advantageously applicable to production on a commercial scale because they entil mny troublesome steps, especially steps of preparing 2,3-diacyl-5-diphenylphosphoryl-D-ribonosyl bromide and removing the protecting groups from the resulting compound, and further because of the low yield of the objective compound. The processes of the third group also entail so many reaction steps as to render them unsuitable for industrial purposes. No process for directly synthesizing purinenucleoside-5'-diphosphate, other than those which comprise diphosphorylating purinenucleoside-5'-monophosphate, has hitherto been proposed.

The present invention is directed to the problem of chemically synthesizing purinenucleoside-5'-phosphate and is based upon the finding that purinenucleoside-5'-phosphate can easily be produced in a good yield by reacting acetylated purine derivatives and acetyl pentose-5-monophosphate, and that, by such reaction, purinenucleoside-5'-diphosphate is also directly produced together with the purinenucleoside-5'-monophosphate.

According to the present invention, purinenucleoside-5'-monophosphate as well as diphosphate can easily be produced in a good yield after only two simple steps.

It is an object of the present invention to provide a novel process for the preparation of purinenucleoside-5'-monophosphate and/or purinenucleoside-5'-diphosphate.

It is also an object of the present invention to prepare purinenucleoside-5'-monophosphate and/or purinenucleoside-5'-diphosphate in a good yield by a simple procedure.

The aforesaid objects are realized by reacting (A) an acetylated purine derivative with (B) a tertiary amine salt of acetylpentose-5-monophosphate under heating, followed by subjecting the resultant product to a deacylating reaction.

The acetylated purine derivatives are exemplified by acetylated hypoxanthine, acetylated guanine and acetylated adenine, hereinafter referred to, for the sake of simplicity, as "hypoxanthine acetate," "guanine acetate" and "adenine acetate," respectively.

These cetylated purine derivatives as the starting materials of the present process can be prepared by allowing a conventional acetylating agent such acetic anhydride, acetyl chloride, etc. to react with the corresponding purine derivatives including hypoxanthine, guanine and adenine at a temperature of from about 80° to about 140° C. in the presence or absence of solvent (e.g. toluene, xylene, etc.) with or without an acid acceptor such as an organic amine (e.g. pyridine, pyrimidine, etc.).

The position which the acetyl group occupies in thus-prepared acetylated purine derivative has not been definitively established. However, it is clear that the 7- or 9-position is acetylated in the case of hypoxanthine; that the 2-amino nitrogen and the 7- or 9-position are acetylated in the case of guanine; and that 6-amino nitrogen and the 7- or 9-position are acetylated in the case of adenine.

The object of the present invention can be achieved by the use of, as one of the starting materials, any of the aforesaid acetylated purine derivatives regardless of the number of the acetyl groups thereof and of the position at which the acetyl group is, or the acetyl groups are, positioned.

On the other hand, the tertiary amine salt of acetylpentose-5-monophosphate is exemplified by 1,2,3-triacetylribose-5-monophosphate and 1,3-diacetyl-2-deoxyribose-5-monophosphate, and these can be prepared in conventional manner, e.g. by a process which comprises allowing an acetylating agent such as acetic anhydride or acetyl chloride to react with the corresponding pentose-5-monophosphate, e.g. ribose-5-monophosphate or 2-deoxyribose-5-monophosphate, at a relatively low temperature in the presence of tertiary amine in excess, or by a process which comprises keeping a mixture of the acetylating agent, as above mentioned, and the corresponding pentose-5-monophosphate, as above exemplified, at 40–50° C. for a short period of time and then allowing a tertiary amine to react with the resultant product.

The tertiary amine may, for example, be pyridine, pyrimidine, picoline, quinoline or triethylamine.

The first step in the process of this invention is carried out by allowing an acetylated purine derivative, e.g. hypoxanthine acetate, guanine acetate or adenine acetate, to react under heating with tertiary amine salt of acetyl- 3-triacetylribose-5′-monophosphate or of 1,3-diacetyl-2-deoxyribose-5-monophosphate. The reaction is preferably effected by melting under heating both the acetylated purine derivative and the tertiary amine salt of acetylpentose-5-monophosphate. The acetylated purine derivative and the tertiary amine salt of acetylpentose-5-monophosphate are subjected to the melting reaction in a molar ratio of about one to two moles of the former per mole of the latter. The reaction conditions such as reaction temperature and the reaction period vary with the particular starting materials. Practically, the melting reaction is carried out by heating at a temperature of from about 100° C. to about 190° C. with stirring for about 10 to about 60 minutes under atmospheric or reduced pressure. The reaction results in good yield without the use of a catalyst, but is advantageously carried out in the presence of a catalyst such as zinc chloride, aluminum chloride, boron fluoride, p-toluene-sulfonic acid, sulfamic acid or sulfuric acid. The amount of the said catalyst varies with the particular starting materials.

The amount of catalyst used is rather small, i.e. about 0.01 to about 2%, more especially about 0.2 to about 0.8% by weight, relative to the total weight of the starting materials.

The reaction between the acetylated purine derivative and the tertiary amine salt of acetylpentose-5-monophosphate can also be effected by heating in the presence of so-called flux such as acetic acid, cresol, benzoic acid, etc. The amount of the flux used is about 10 to about 250%, more especially about 100 to about 200% by weight, relative to the total weight of the starting materials. The reaction conditions such as reaction temperature and the reaction period are the same as those of the melting reaction mentioned above.

By the aforesaid first step in the present process, generally, a mixture of acetylated purinenucleoside-5′-monophosphate and acetylated purinenucleoside-5′-diphosphate corresponding to the starting materials, is produced.

The second step in the method of this invention is carried out by subjecting thus-produced acetylated 5′-purinenucleotide to a deacetylating reaction.

The acetylated 5′-purinenucleotide can be subjected to the deacetylating reaction in the form of reaction mixture or in purified form recovered from the same. The deacetylating method may be a per se conventional deacetylating method such as a process which comprises keeping the acetylated 5′-purinenucleotide in an aqueous ammonia solution at room temperature (15° to 30° C.) or under reflux, or a process which comprises keeping the acetylated 5′-purinenucleotide in a large amount of methanolic ammonia solution under stirring for a relatively long period, or a process which comprises refluxing the acetylated 5′-purinenucleotide suspended in methanolic sodium methoxide solution under heating.

Thus, the desired 5′-purinenucleotide is produced. The product, generally, consists of purinenucleoside-5′-monophosphate and purinenucleoside-5′-diphosphate. The 5′-purinenucleotide can be recovered from the reaction mixture either in free state or in the form of various salts such as sodium salt, potassium salt, ammonium salt, etc.

When desired, each of the purinenucleoside-5′-monophosphate and the purinenucleoside-5′-diphosphate can be separately recovered by such per se conventional procedures as subjecting the reaction mixture to fractional recrystallization, treatment with anion exchange resin or activated charcoal, extraction with a suitable organic solvent, etc.

Following are presently preferred illustrative embodiments of this invention. In these examples, the parts by weight bear the same relationship to parts by volume as do grams to milliliters. Percentages are by weight.

EXAMPLE 1

3.2 parts by weight of guanine acetate is prepared by refluxing a mixture of 3.5 parts by weight of guanine and 700 parts by volume of acetic anhydride under heating for 4 hours.

A mixture of 2.0 parts by weight of thus-prepared guanine acetate and 7.0 parts by weight of pyridinium-1,2,3-triacetylribose-5-monophosphate is melted at 155° C. with stirring under reduced pressure for 15 minutes, whereupon a reaction takes place. After the reaction is completed, the resultant product is cooled to ambient temperature to yield solid material. The solid material is ground and the resultant powder is dissolved in 1200 parts by volume of ammonia-saturated methanol at 0° C. After the mixture has been kept standing at a room temperature for 3 days, methanol and ammonia are removed therefrom by distillation under reduced pressure to give yellowish residue. The residue is dissolved in a small amount of a mixture of water and methanol (1:1 by volume) at 50° C., followed by cooling to room temperature to give 0.7 part by weight of yellowish crystals. This product is identified by electrophoresis, ultraviolet absorption spectrum, and thin layer chromatography, to be a mixture of guanosine-5′-monophosphate and guanosine-5′-diphosphate.

EXAMPLE 2

3.3 parts by weight of hypoxanthine acetate are prepared by refluxing a mixture of 3.5 parts by weight of hypoxanthine and 140 parts by volume of acetic anhydride under heating for 2 hours.

A mixture of 2.0 parts by weight of thus-obtained hypoxanthine acetate and 7.0 parts by weight of pyridinium-1,2,3-triacetylribose-5-monophosphate is melted at 155° C. with stirring under reduced pressure for 15 minutes to allow a reaction to take place. After the reaction is completed, the resultant mixture is cooled to room temperature to yield solid material. The solid material is ground and the resultant powder is dissolved in 1200 parts by volume of ammonia-saturated methanol at 0° C. After being kept standing at 0° C. for 2 days, methanol and ammonia are removed from the mixture by distillation to give a residue. The residue is dissolved in a small amount of a mixture of water and methanol (1:1 by volume) at 50° C., followed by cooling at room temperature to give 0.1 part by weight of yellowish crystals. This product is identified by electrophoresis, ultraviolet absorption spectrum, thin layer chromatography, to be a mixture of inosine-5′-monophosphate and inosine-5′-diphosphate.

EXAMPLE 3

A mixture of 0.2 part by weight of guanine acetate prepared after the manner described in Example 1, 0.7 part by weight of pyridinium-1,2,3-triacetylribose-5-monophosphate and 0.01 part by weight of sulfamic acid are melted with stirring under reduced pressure at 150° C. for 15 minutes to allow a reaction to take place. After the reaction is completed, the resultant mixture is cooled to room temperature to give solid material. The solid material is ground and the resultant powder is suspended in 100 parts by volume of 0.1 N solution of sodium methoxide in methanol. After refluxing the mixture for 3 hours, the solvent is removed by distillation.

The obtained residue is mixed with 40 parts by volume of water, followed by neutralization with dilute hydrochloric acid. The mixture is subjected to filtration. After being adjusted to pH 2.5 with dilute hydrochloric acid, the filtrate is passed through a column of activated charcoal. After washing with water, the objective substances are eluted with a 0.1% aqueous ammonia solution. The ammonia is removed from the eluate by distillation under reduced pressure to give yellowish residue. The residue is dissolved in a small amount of a mixture of water and methanol (1:1 by volume) at 50° C., followed by cooling to room temperature to yield 0.09 part by weight of a mixture of guanosine-5′-monophosphate and guanosine-5′-diphosphate.

EXAMPLE 4

A mixture of 2.0 prts by weight of guanine acetate prepared after the manner described in Example 1, 5.0 parts by weight of pyridinium - 1,2,3 - triacetylribose - 5-monophosphate and 0.06 part of zinc chloride is heated with stirring under reduced pressure at 150° C. for 20 minutes to allow a reaction to take place. After the reaction is completed, the resultant mixture is cooled to room temperature to give solid material. The solid material is ground and the resultant powder is suspended in 700 parts by volume of 0.2 N solution of sodium methoxide in methanol. After the mixture is refluxed vigorously for 3 hours, the methanol is removed by distillation. The residue is mixed with 100 parts by volume of water, followed by neutralization with dilute hydrochloric acid. The mixture is subjected to filtration. After being adjusted to pH 2.5 with dilute hydrochloric acid, the filtrate is passed through a column of activated charcoal. After washing with water, the objective substances are eluted with a 0.1 aqueous ammonia solution. The ammonia is removed from the eluate by distillation under reduced pressure to give yellowish residue. The residue is dissolved in a small amount of a mixture of water and methanol (1:1 by volume) at 50° C., followed by cooling to room temperature to give 0.92 part by weight of a mixture of guanosine-5'-monophosphate and guanosine-5'-diphosphate.

EXAMPLE 5

A mixture of 2.0 parts by weight of hypoxanthine acetate prepared after the manner described in Example 2, 8.8 parts by weight of pyridinium-1,2,3-triacetyl-5-ribose monophosphate and 0.03 part by weight of zinc chloride is melted at 160° C. with stirring under reduced pressure for 15 minutes to allow a reaction to take place. After the reaction is completed, the resultant mixture is cooled to room temperature to give solid material. The solid material is ground and the resultant powder is dissolved in 50 parts by volume of 28% aqueous ammonia solution at 0° C.

After the mixture is kept standing at 0° C. for 2 days, the ammonia is removed from the mixture by distillation under reduced pressure to give yellowish residue. The residue is dissolved in a small amount of a mixture of water and methanol (1:1 by volume) at 50° C., followed by cooling to room temperature to give 0.85 part by weight of a mixture of inosine-5'-monophosphate and inosine-5'-diphosphate as yellowish crystals.

EXAMPLE 6

3.2 parts by weight of adenine acetate is prepared by refluxing a mixture of 3.5 parts by weight of adenine and 140 parts by volume of acetic anhydride under heating for 2 hours.

A mixture of 1.1 parts by weight of thus-prepared adenine acetate and 4.1 parts by weight of pyridinium-1,2,3-triacetylribose-5-monophosphate is melted at 160° C. with stirring under reduced pressure for 30 minutes to allow a reaction to take place. After the reaction is completed, the resultant mixture is cooled to room temperature to give solid material. The solid material is ground and the resultant powder is mixed with 80 parts by volume of 28% aqueous ammonia solution. After the mixture is kept standing at room temperature for 1 day, the ammonia is removed from the mixture by distillation under reduced pressure until a neutral mixture is left. The resultant mixture is diluted with water to make the total volume 100 parts by volume, and then the mixture is adjusted to pH 2.0 with dilute hydrochloric acid to give precipitates. After removal of the precipitates, the mixture is passed through a column of activated charcoal, previously adjusted to pH 2.0 with dilute hydrochloric acid. After the column is washed with water until neutral eluate is obtained, the objective substances are eluted with a 0.1% aqueous ammonia solution.

After being concentrated under reduced pressure, the eluate containing the objective substances is passed through a column of anion exchange resin, Cl-form (e.g. Dowex 1 x 8), whereby the objective substances are adsorbed on the resin. The column is subjected to elution with 0.01 N-hydrochloric acid, whereby first the fraction of adenosine-5'-monophosphate and subsequently the fraction of adenosine-5'-diphosphate are eluted.

After being concentrated under reduced pressure, the adenosine-5'-monophosphate fraction is passed through a column of activated charcoal. After the column is washed with water, adenosine-5'-monophosphate is eluted therefrom with 0.1% aqueous ammonia solution, and the eluate is concentrated under reduced pressure to give 0.11 part by weight of crude crystals of adenosine-5'-monophosphate.

This product is identical with authentic adenosine-5'-monophosphate in ultraviolet absorption spectrum, thin layer chromatography, elementary analysis, paper chromatography, electrophoresis, amount of total phosphate, amount of labile phosphate and consumed amount of periodic acid.

The adenosine-5'-diphosphate fraction is treated after the manner just above mentioned to give 0.1 part by weight of crude crystals of adenosine-5'-diphosphate.

This product is identical with authentic adenosine-5'-diphosphate in ultraviolet absorption spectrum, thin layer chromatography, elementary analysis, paper chromatography, electrophoresis, amount of total phosphate, amount of labile phosphate and consumed amount of periodic acid.

EXAMPLE 7

A mixture of 1.5 parts by weight of guanine acetate prepared after the manner described in Example 1 and 4.7 parts by weight of 1,3-diacetyl-2-deoxyribose-5-monophosphate is melted at 150° C. with stirring under reduced pressure for 30 minutes to allow a reaction to take place. After the reaction is completed, the resultant mixture is cooled to room temperature to give a solid material. The solid is ground and the resultant mixture is further mixed with 100 parts by volume of 28% aqueous ammonia solution. After the total mixture is kept standing at room temperature for 3 days, the ammonia is removed from the mixture by distillation under reduced pressure until a neutral mixture remains. The resultant mixture is diluted with water to make the total volume 150 parts by volume, and then the mixture is adjusted to pH 2.0 with dilute hydrochloric acid to give precipitates. After removal of the precipitates, the mixture is passed through a column of activated charcoal, which is previously adjusted to pH 2.0 with dilute hydrochloric acid. After the column is washed with water until neutral eluate is obtained, the objective substances are eluted with 0.1% aqueous ammonia solution. After being concentrated under reduced pressure, the eluate containing the objective substances is passed through a column of anion exchange resin, Cl-form (Dowex 1 x 8), whereby the objective substances are adsorbed on the resin. The column is subjected to elution with 0.01 N-hydrochloric acid, whereby first the 2'-deoxy-guanosine-5'-monophosphate fraction and subsequently the 2'-deoxy-guanosine-5'-diphosphate fraction are eluted.

After being concentrated under reduced pressure, the 2'-deoxy-guanosine-5'-monophosphate fraction is passed through a column of activated charcoal. After the column has been washed with water, 2'-deoxy-guanosine-5'-monophosphate is eluted therefrom with 0.1% aqueous ammonia solution. The eluate is concentrated under reduced pressure to give 0.22 part by weight of crude crystals of 2'-deoxy - guanosine-5'-monophosphate. This product is identical with authentic 2'-deoxy-guanosine-5'-monophosphate in ultraviolet absorption spectrum, thin layer chromatography, elementary analysis, paper chromatography, electrophoresis, amount of total phosphate, amount of labile phosphate and consumed amount of periodic acid.

The 2'-deoxy-guanosine-5'-diphosphate fraction is treated after the manner just above described to give 0.19 part by weight of crude crystals of 2'-deoxy-guanosine-5'-diphosphate. This product is identical with authentic 2'-deoxy-guanosine-5'-diphosphate in ultraviolet absorption spectrum, thin layer chromatography, elementary analysis, paper chromatography, electrophoresis, amount of total phosphate, amount of labile phosphate and consumed amount of periodic acid.

EXAMPLE 8

A mixture of 0.89 part by weight of hypoxanthine acetate prepared after the manner described in Example 2, 2.57 parts by weight of 1,2,3-triacetylribose-5-monophosphate and 3.0 parts by weight of benzoic acid is heated at 130° C. with stirring under reduced pressure for 100 minutes to allow a reaction to take place. After the reaction is completed, the resultant product is subjected to extraction with 240 parts by volume of diethyl ether to remove benzoic acid. The residue is ground and the resultant powder is mixed with 50 parts by volume of a 20% aqeuous ammonia solution. After the mixture is kept standing at room temperature for one day, the ammonia is removed from the mixture by distillation under reduced pressure until a neutral mixture is left. The resultant mixutre is treated after the manner described in Example 7 to yield 0.3 part by weight of a mixture of inosine-5'-monophosphate and inosine-5'-diphosphate.

Having thus disclosed the invention, what is claimed is:

1. A process for preparing 5'-purinenucleotide selected from the group consisting of inosine-5'-monophosphate and/or inosine-5'-diphosphate, guanosine-5'-monophosphate and/or guanosine-5'-diphosphate, adenosine-5'-monophosphate and/or adenosine-5'-diphosphate, and the corresponding 2'-deoxy compounds, which comprises heating (A) an acetylated purine derivative selected correspondingly to the said 5'-purinenucleotide, from the group consisting of acetylated hypoxanthine, acetylated guanine and acetylated adenine, with (B) a tertiary amine salt of acetylpentose-5-monophosphate selected, correspondingly to the said 5'-purinenucleotide, from the group consisting of 1,2,3-triacetylribose-5-monophosphate and 1,3-diacetyl-2-deoxyribose-5-monophosphate; and subjecting the product of the ensuing reaction to action of a deacetylating agent.

2. A process according to claim 1, wherein both the acetylated purine derivative and the tertiary amine salt of acetylpentose-5-monophosphate are melted at a temperature from about 100° C. to about 190° C.

3. A process according to claim 1, wherein both the acetylated purine derivative and the tertiary amine salt of acetylpentose-5-monophosphate are melted at a temperature from about 100° C. to about 190° C. in the presence of a catalyst selected from the group consisting of zinc chloride, aluminum chloride, boron fluoride, p-toluene-sulfonic acid, sulfamic acid and sulfuric acid.

4. A process according to claim 1, wherein the deacetylating reaction is carried out by treating with an aqueous ammonia solution.

5. A process according to claim 1, wherein the acetylated purine derivative is acetylated hypoxanthine and the acetylpentose-5-monophosphate is 1,2,3-triacetylribose-5-monophosphate.

6. A process according to claim 1, wherein the acetylated purine derivative is acetylated guanine and the acetylpentose-5-monophosphate is 1,2,3-triacetylribose-5-monophosphate.

7. A process according to claim 1, wherein the acetylated purine derivative is acetylated adenine and the acetylpentose-5-monophosphate is 1,3-diacetyl-2-deoxyadenine-5-monophosphate.

References Cited
UNITED STATES PATENTS 3,171,833   3/1965   Sorm et al. _____ 260—211.5
3,321,463   5/1967   Moffatt _____ 260—211.5

LEWIS GOTTS, *Primary Examiner.*

JOHNNIE R. BROWN, *Assistant Examiner.*